M. WARD.
Corn Planter.
No. 12,608.
Patented Mar. 27, 1855.
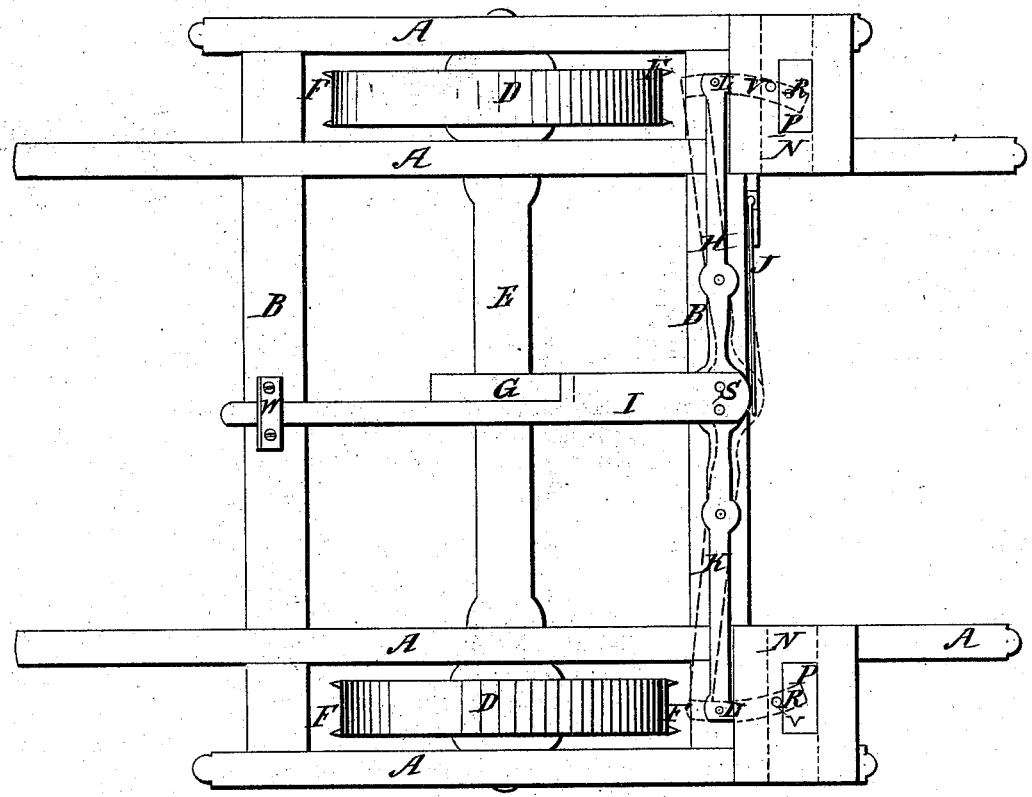
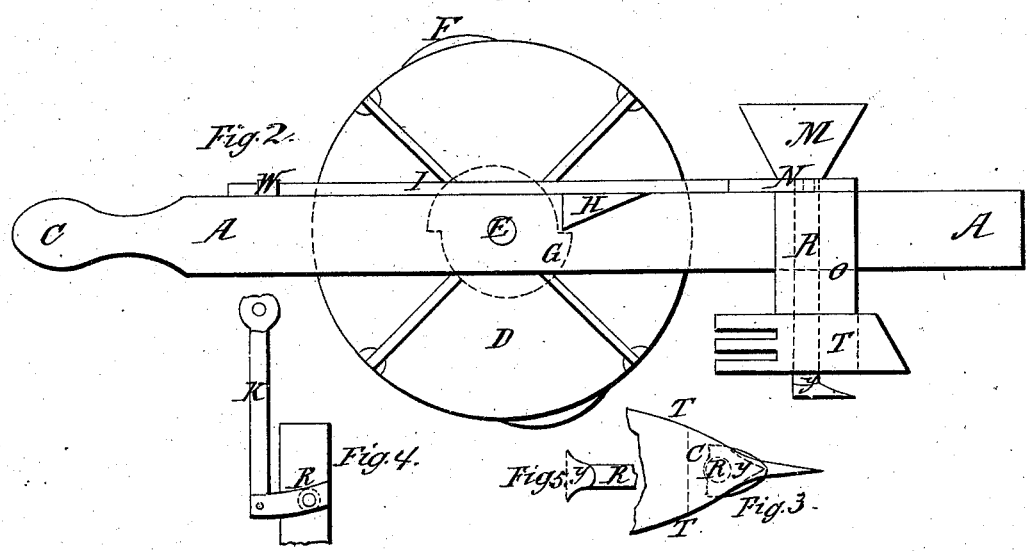

UNITED STATES PATENT OFFICE.

MYRON WARD, OF OWEGO, NEW YORK.

IMPROVEMENT IN SEED-PLANTERS.

Specification forming part of Letters Patent No. 12,608, dated March 27, 1855.

*To all whom it may concern:*

Be it known that I, MYRON WARD, of Owego, county of Tioga, and State of New York, having invented certain new and useful Improvements in Seed-Planters, do hereby declare the following to be a full, clear, and exact description of the same, reference being had to the accompanying drawings, making a part thereof, in which—

Figure 1 represents a top plan of the machine. Fig. 2 represents a side view thereof. Fig. 3 represents the bottom of one of the shoes and shares forward of the compressors and wheels. Fig. 4 represents a top view of the charger and seed-gage. Fig. 5 represents a back side view of the shoe, leaving a concave space for the seed to spread upon the ground as it drops from the charger or seed-gage.

The nature of my invention relates to the construction of the share for removing obstructions foward of the shoe and permitting the fine mold or mellow earth to fall into the furrow laterally through the slots in the sides thereof behind the shoe, and also the compressors on the rims of the compressing-wheels D D, which compressors crowd the earth laterally and over the seed when deposited in the earth and complete the covering.

To enable others skilled in the art to make and use my invention, I will proceed to describe the same with reference to the drawings.

The frame A and B of the machine may be made in any well-known substantial manner, and supported on two wheels, D D, which are arranged on and fastened to an axle or shaft, E. The said wheels are so placed as to follow the line of the furrows in which the seed is dropped, so as to pack or press the earth over it.

The mode of operation is thus: The seed is placed in the box M, as shown in Fig. 2, and as the machine moves forward the cam G on main shaft E, as shown in Fig. 2, moves the rod I forward, which operates the levers K K, they being connected with rod I by joints at S, Fig. 1, and draws out the chargers or seed-gages V V from under the plates P P, which are immediately filled with seed, when the stopper H, attached to the feed-rod I, falls into the break on the periphery of the cam-wheel G. The spring J then forces the said feed-rod back, and said stopper H is also forced against or into the break on the said cam G, which, operating on the levers K K, forces the chargers V V under the plates P P (which plates are thin disks of metal) upon the bottom of the hoppers N N, or seed-boxes at M M, and over the holes in the tubes R R, as seen in Fig. 4, from which the seed drops directly from the chargers V V into the furrows under and inside of the shoes Y Y, as shown inverted at Fig. 3. This shoe is concave underneath for the seed to spread, as shown at Fig. 3, and flattened toward the point, the intention of which is to pass under the surface of the earth and let it fall in laterally behind the shoe, and can be gaged to run at any required depth in the ground by raising or lowering the thills attached to the frame of the machine. The shares T T have slots in the sides, as shown in Fig. 2, which permit the fine mold or mellow earth to force itself in laterally behind the shoes Y Y into and over the channel where the seed is dropped, which shares are so constructed with sharp points and wings on each side, and attached to blocks O O, that they remove lumps, sods, &c., and leave a level surface forward of the shoes Y Y, as shown at T, Figs. 2 and 3. The compressors F F on the periphery of the wheels D D, as they move forward, come directly over the hill or place where the seed is dropped and crowd or compress laterally and over it; or, in other words, the seed is dropped through the tube within and under the concavity of the shoe, which permits the seed to spread upon the ground, and the earth falling in back of the shoe of its own gravity, together with the fine mold forced through the slots in the share and the pressure on the earth of the compressors as they pass over the hill, as above described, the covering is made complete and more perfect than by any other machine now in use. The compressors can be made of cast-iron or any other material, if preferable.

The chargers or seed-gages may be made of wood or metal and attached to the levers at K K, as shown in Fig. 1, by joints, pins, or otherwise, at L, their upper surface sliding on a level with the floor of the seed-boxes M M, with a hole through each of the proper size to contain the quantity of seed required for the hill, which holes, when moved over the tubes R R, as shown in Fig. 2, are instantly discharged of their contents into the furrow, as aforesaid, dispensing with all complex valves and fixtures, and, being simple in construction, are not liable to get out of repair in using for corn or any other seed.

The back end of the feed-rod I, as shown at W, may be held in its place to slide freely by a strap of metal, or in any other similar or suitable way.

I am aware that mold-boards for plows have been made slotted in order to break stiff soil; also, that a continuous groove triangular in its section has been employed upon the tread of a covering-wheel; also, that a slotted though not adjustable share has been used in a seed-planter; but

What I claim, and desire to secure by Letters Patent of the United States, is—

1. The adjustable slotted share for the purpose of removing obstructions and at the same time allowing the fine earth to pass through the slots, which share is made adjustable by means of a thumb-screw and plate in rear.

2. The short compressing-blocks on the periphery of the wheel, which compressors crowd the earth laterally over the seed, and at the same time indicate the place of the hill, and by which means the grain can be planted in check-rows.

MYRON WARD.

Witnesses:
   CHARLES P. AVERY,
   E. DOUGHERTY.